(12) United States Patent
Sugita et al.

(10) Patent No.: US 12,244,931 B2
(45) Date of Patent: Mar. 4, 2025

(54) INFORMATION PROCESSING DEVICE TO SET PHOTOGRAPHING DEVICE, INFORMATION PROCESSING DEVICE TO RETRIEVE PHOTOGRAPHING RECIPE, INFORMATION PROCESSING METHOD, AND NON-TRANSITORY COMPUTER READABLE MEDIUM

(71) Applicant: CANON KABUSHIKI KAISHA, Tokyo (JP)

(72) Inventors: Norio Sugita, Kanagawa (JP); Ryoji Yoshie, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 304 days.

(21) Appl. No.: 17/860,449

(22) Filed: Jul. 8, 2022

(65) Prior Publication Data

US 2023/0013044 A1   Jan. 19, 2023

(30) Foreign Application Priority Data

Jul. 15, 2021  (JP) .................................. 2021-116969

(51) Int. Cl.
*H04N 23/73* (2023.01)
*H04N 23/66* (2023.01)

(52) U.S. Cl.
CPC .............. *H04N 23/73* (2023.01); *H04N 23/66* (2023.01)

(58) Field of Classification Search
CPC ...... H04N 23/73; H04N 23/66; H04N 23/617; H04N 23/72; H04N 23/661
See application file for complete search history.

(56) References Cited

U.S. PATENT DOCUMENTS

| 8,803,981 | B2 * | 8/2014 | Brunner | H04N 5/265 |
| | | | | 348/208.1 |
| 9,538,071 | B2 * | 1/2017 | Kim | H04N 5/907 |
| 11,790,492 | B1 * | 10/2023 | Ahmad | G06N 3/0495 |
| 2006/0024043 | A1 * | 2/2006 | Kumagai | H04N 5/765 |
| | | | | 386/E5.002 |
| 2008/0050111 | A1 * | 2/2008 | Lee | G03B 19/00 |
| | | | | 396/429 |
| 2009/0219414 | A1 * | 9/2009 | Makino | G06T 5/92 |
| | | | | 348/E9.053 |
| 2012/0059490 | A1 * | 3/2012 | Uehara | A63F 13/213 |
| | | | | 700/92 |

(Continued)

FOREIGN PATENT DOCUMENTS

| JP | 2007-027945 A | 2/2007 |
| WO | 2013/179742 A1 | 12/2013 |

*Primary Examiner* — Chiawei Chen
(74) *Attorney, Agent, or Firm* — Cowan, Liebowitz & Latman, P.C.

(57) ABSTRACT

An information processing device includes: a determination unit that determines retrieval information used to retrieve at least one photographing recipe including information on photographing; an acquisition unit that acquires relative setting values representing relative values of photographing setting values, corresponding to one of the at least one photographing recipe retrieved on a basis of the retrieval information; and a setting unit that sets a photographing device to perform photographing on a basis of the relative setting values.

18 Claims, 13 Drawing Sheets

| PHOTOGRAPHING-RECIPE EVALUATION ITEM | EVALUATION VALUE | |
|---|---|---|
| COMPREHENSIVE EVALUATION | LOW 1 2 3 4 [5] HIGH | 1403 |
| DIFFICULTY | LOW 1 [2] 3 4 5 HIGH | 1404 |
| REPRODUCIBILITY | LOW 1 2 3 4 [5] HIGH | 1405 |
| SATISFACTION | LOW 1 2 3 [4] 5 HIGH | 1406 |
| ACCURACY OF ARTICLE | LOW 1 2 [3] 4 5 HIGH | 1407 |
| COMMENT | I AM VERY SATISFIED WITH PICTURE LIKE PHOTOGRAPHING RECIPE. | 1408 |
| PHOTOGRAPHING IMAGE | [image of smiley face] | 1409 |

1401  1402

(56) References Cited

U.S. PATENT DOCUMENTS

| | | | | |
|---|---|---|---|---|
| 2013/0050507 A1* | 2/2013 | Syed | ............... | H04N 1/00244 |
| | | | | 348/207.1 |
| 2013/0286232 A1* | 10/2013 | Sheth | ............... | H04N 1/32117 |
| | | | | 348/207.11 |
| 2014/0093184 A1* | 4/2014 | Wang | ............... | H04N 1/00244 |
| | | | | 382/254 |
| 2014/0354768 A1* | 12/2014 | Mei | ............... | H04N 23/70 |
| | | | | 348/222.1 |
| 2020/0059605 A1* | 2/2020 | Liu | ............... | H04N 23/667 |
| 2021/0385370 A1* | 12/2021 | Kang | ............... | H04N 23/611 |
| 2022/0159177 A1* | 5/2022 | Oshima | ............... | G06V 10/42 |
| 2022/0335587 A1* | 10/2022 | Hama | ............... | H04N 23/631 |

* cited by examiner

FIG. 7

| PHOTOGRAPHING SETTING ITEMS | RELATIVE SETTING VALUES |
|---|---|
| APERTURE(Av) | BLURRING [1] 2 3 4 5 EMPHASIZING |
| SHUTTER SPEED(Tv) | PAN 1 2 3 4 5 STOP |
| BRIGHTNESS (EXPOSURE CORRECTION) | DARK 1 2 [3] 4 5 BRIGHT |
| WHITE BALANCE 1 | BLUE 1 2 3 [4] 5 UMBER |
| WHITE BALANCE 2 | GREEN 1 2 3 [4] 5 MAGENTA |

| PHOTOGRAPHING RECIPE NAME (1101) | LIKE (1102) | BOOKMARK (1103) | FOLLOW TO CREATOR (1104) |
|---|---|---|---|
| PERSON PORTRAIT PHOTOGRAPHING (1105) | REGISTERED | REGISTERED | FOLLOWING |
| HOW TO PHOTOGRAPH CHILD (1106) | REGISTERED | REGISTERED | — |
| STOPPING OBJECT IN SPORTS DAY (1107) | NOT REGISTERED | REGISTERED | — |
| PHOTOGRAPHING IN GRADUATION CEREMONY (1108) | REGISTERED | NOT REGISTERED | — |
| HOW TO PHOTOGRAPH MAKING USE OF BACKGROUND (1109) | NOT REGISTERED | NOT REGISTERED | FOLLOWING |
| BASEBALL BATTING SCENE (1110) | NOT REGISTERED | NOT REGISTERED | — |

FIG. 11

| PHOTOGRAPHING SETTING ITEM | RELATIVE SETTING VALUE |
|---|---|
| APERTURE(Av) | 1 |
| SHUTTER SPEED(Tv) | – |
| BRIGHTNESS (EXPOSURE CORRECTION) | 3 |
| WHITE BALANCE 1 | 4 |
| WHITE BALANCE 2 | 4 |

INFORMATION PROCESSING DEVICE TO SET PHOTOGRAPHING DEVICE, INFORMATION PROCESSING DEVICE TO RETRIEVE PHOTOGRAPHING RECIPE, INFORMATION PROCESSING METHOD, AND NON-TRANSITORY COMPUTER READABLE MEDIUM

BACKGROUND OF THE INVENTION

Field of the Invention

The present invention relates to an information processing device, an information processing method, and a non-transitory computer readable medium.

Description of the Related Art

In recent years, the widespread use of social network services (SNS) allow users to easily share photographed content with many people via the Internet. Many of the users desire to photograph content (highly-evaluated content) such as beautiful and attractive still images or interesting moving images and receive favorable responses in the SNS. Then, with settings (photographing settings) for photographing being shared among many people, the users realize desired photographing on the basis of the shared photographing settings.

In Japanese Patent Application Laid-open No. 2007-27945, information on photographing conditions is transferred from a photographing deice to a server when the photographing conditions are input to the photographing device through a GPS or the operation to a user terminal. Then, the server retrieves sample images and photographing settings on the basis of the photographing conditions and transmits the same to the user terminal. Thus, in Japanese Patent Application Laid-open No. 2007-27945, a user is allowed to retrieve sample images and photographing settings through the input of photographing conditions, such as a keyword and position information, to a photographing device and easily set the photographing settings in the photographing device.

On the other hand, WO 2013/179742 proposes a technology in which sample images or photographing settings are evaluated by a plurality of persons and images photographed under the photographing settings are evaluated. Then, a user is allowed to select the most desirable photographing settings from among the sample images and the photographing settings evaluated by the plurality of persons and set the same in a photographing device.

However, in the technologies of Japanese Patent Application Laid-open No. 2007-27945 and WO 2013/179742, a photographing environment is different between photographing of sample images and photographing by a user. Therefore, even where the same photographing settings as those of sample images are selected, a user has a difficulty in acquiring a photographing image expressed similarly to the sample images.

SUMMARY OF THE INVENTION

In view of the above problem, the present invention has an object of providing a technology with which a user is allowed to easily acquire a photographing image expressed similarly to a certain image.

An aspect of the present invention is an information processing device including at least one memory and at least one processor which function as: a determination unit configured to determine retrieval information used to retrieve at least one photographing recipe including information on photographing; an acquisition unit configured to acquire relative setting values representing relative values of photographing setting values, corresponding to one of the at least one photographing recipe retrieved on a basis of the retrieval information; and a setting unit configured to set a photographing device to perform photographing on a basis of the relative setting values.

An aspect of the present invention is an information processing method including: a step of determining retrieval information used to retrieve at least one photographing recipe including information on photographing; a step of acquiring relative setting values representing relative values of photographing setting values, corresponding to one of the at least one photographing recipe retrieved on a basis of the retrieval information; and a step of setting a photographing device to perform photographing on a basis of the relative setting values.

Further features of the present invention will become apparent from the following description of exemplary embodiments with reference to the attached drawings.

BRIEF DESCRIPTION OF THE DRAWINGS

FIG. 7 is a diagram illustrating relative setting values.
FIG. 10 is a diagram illustrating candidate selection processing.
FIG. 11 is a diagram illustrating application processing.

DESCRIPTION OF THE EMBODIMENTS

Hereinafter, an embodiment of the present invention will be described in detail with reference to the drawings.

Embodiment

Figure 6:
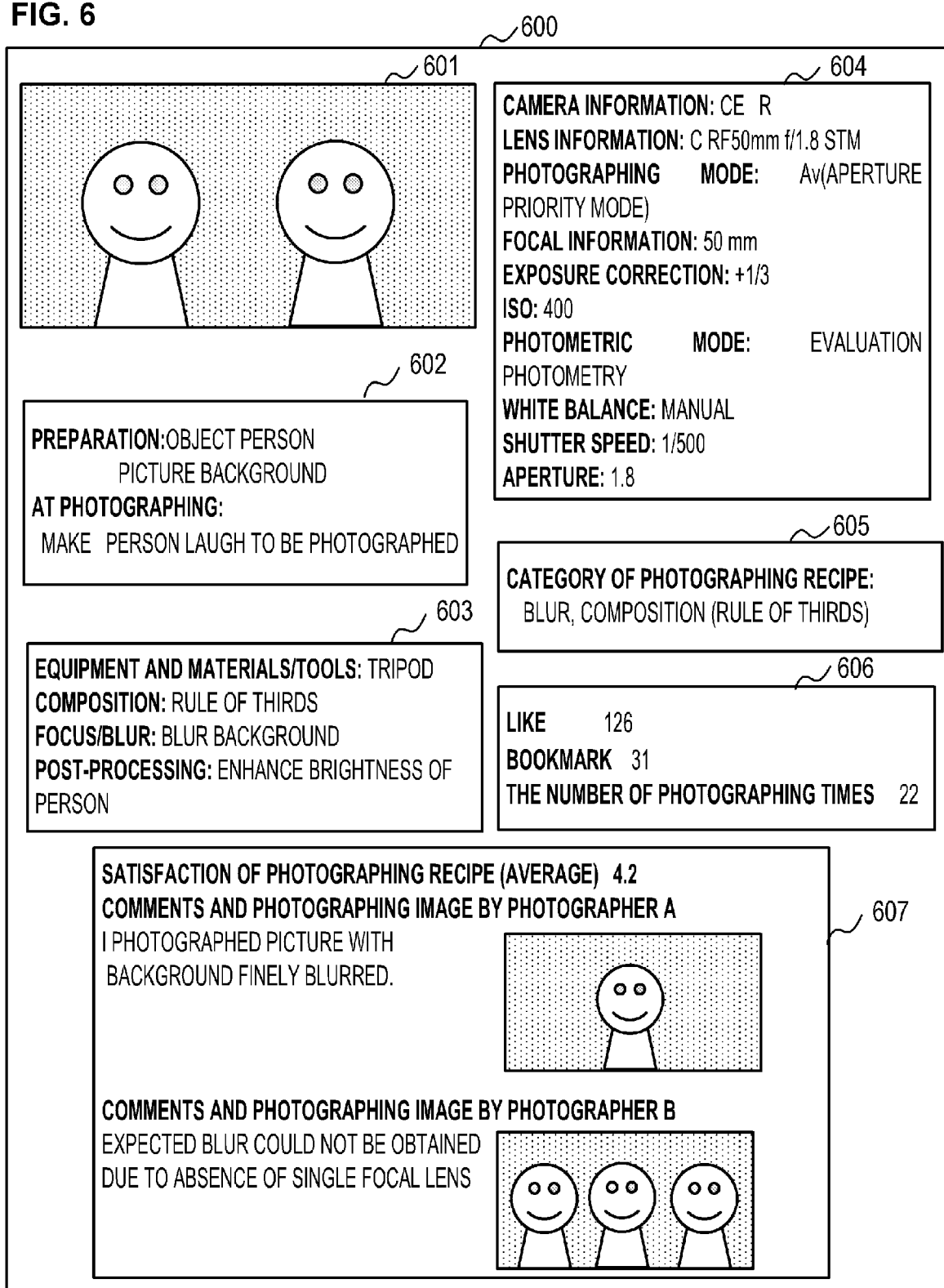
FIG. 6 is a diagram illustrating an example of a photographing recipe.

First, a photographing recipe including information on photographing for photographing a certain image will be described. The photographing recipe is information for photographing a beautiful and attractive image or an interesting moving image. FIG. 6 is a diagram illustrating a photographing recipe 600 in detail as an example. The photographing recipe 600 is an example of a photographing recipe about portrait photographing of a person (photographing for acquiring a portrait image of a person).

The photographing recipe 600 includes information of a sample image 601, a photographing procedure 602, photographing tricks 603, photographing setting information 604, a category 605, photographing-recipe evaluation information 606, and post-photographing evaluation information 607. The sample image 601 is a sample of an image photographed in accordance with a photographing recipe. Through viewing of the sample image 601, a user is allowed to specifically assume (image) an image acquirable by performing photographing in accordance with a photographing recipe. The photographing procedure 602 is information describing a photographing procedure such as a preparation and an action necessary at photographing.

The photographing tricks 603 are information describing tricks for photographing a better image (equipment and materials or tools used at photographing, composition showing the arrangement of objects (subjects), focus or blur, and a post-processing method). The photographing setting information 604 shows information on a photographing device (such as camera information and lens information), a photographing mode, and photographing setting values of the photographing device used at photographing (a focal distance, exposure correction, ISO sensitivity, a photometric mode, white balance, a shutter speed, and an aperture value).

The category 605 shows the category of a photographing recipe. For example, important points in the photographing recipe of FIG. 6 are that persons are in focus while a background is not in focus and is blurred finely, and that the objects are arranged in a well-balanced manner by the rule of thirds. For this purpose, the category 605 shows the category of "blur" and "composition (the rule of thirds)."

The photographing-recipe evaluation information 606 is information showing the total of values evaluated as a "like" and a "bookmark" by a plurality of users who have employed a photographing recipe, and the number of photographing times. "The number of photographing times" is the number of times at which photographing setting values relating to a photographing recipe have been set in a photographing device for photographing. A "like" is an evaluation registered by a user when he/she regards information on a photographing recipe as being valuable. A "bookmark" shows that the storage destination of a photographing recipe has been marked (the storage destination has been registered) so that a user is allowed to return to the photographing recipe when he/she wants to see the photographing recipe again later.

The post-photographing evaluation information 607 is information including the satisfaction of a photographing recipe expressed as a score and uploaded comments or photographing images after users have performed photographing in accordance with the photographing recipe.

Note that the photographing recipe 600 may include other information on photographing such as a photographing place and a photographing time, besides the above information (items).

Figure 1:
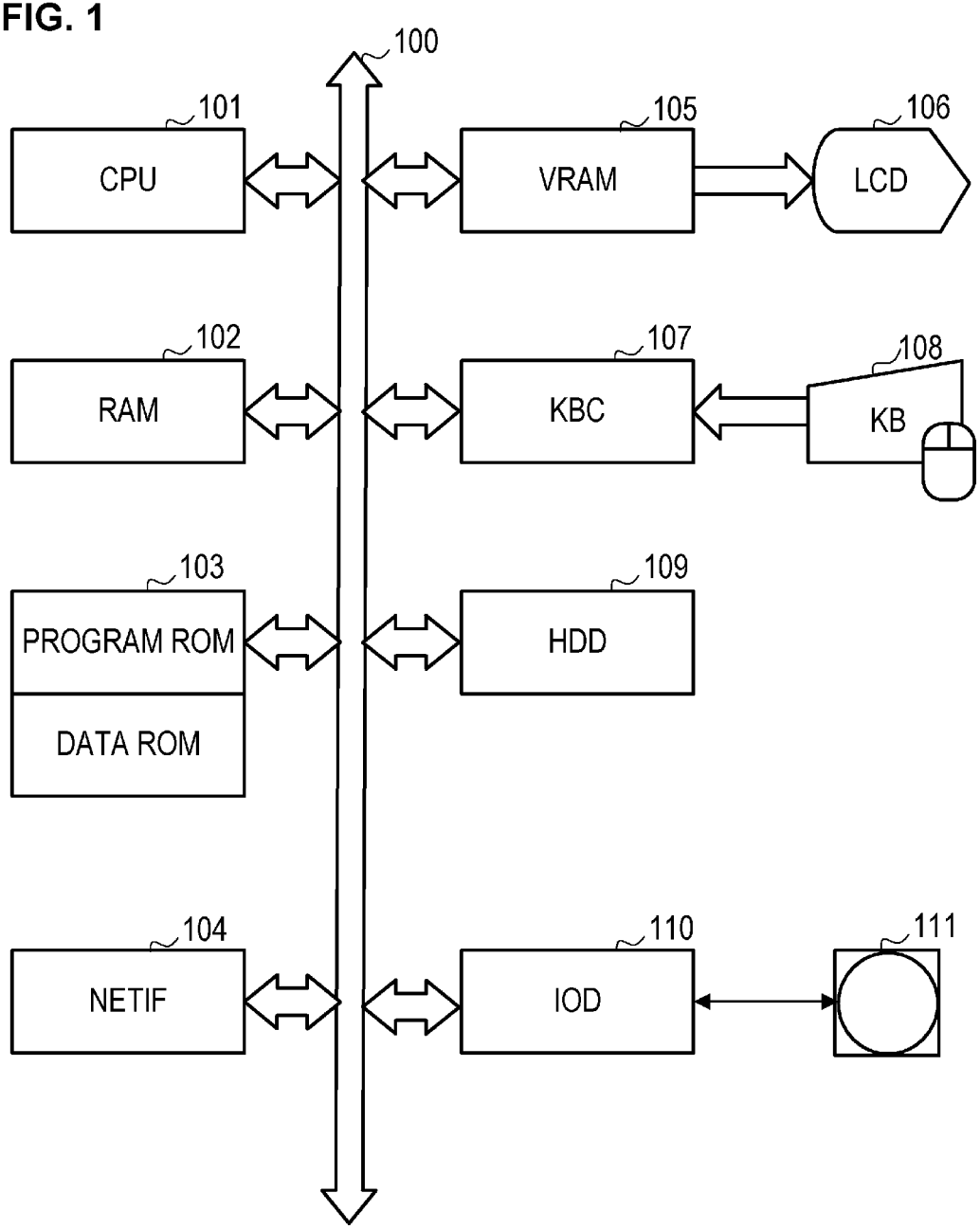
FIG. 1 is a hardware configuration diagram of an information processing device.

(Hardware Configuration of Information Processing Device) FIG. 1 is a hardware configuration diagram of an information processing device 1 according to the present embodiment. The information processing device 1 has a transmission bus 100, a CPU 101, a RAM 102, a ROM 103, a NETIF 104, a VRAM 105, an LCD 106, a KBC 107, a KB 108, an HDD 109, an IOD 110, and a storage medium 111.

The CPU 101 is a central processing unit that is responsible for calculating and controlling the respective constituting elements of the information processing device 1. The CPU 101 controls the respective constituting elements of the information processing device 1 via the transmission bus 100 in accordance with an application program stored in the HDD 109. In the present embodiment, the application program is a software program (module) used by the CPU 101 in the present embodiment to control the respective constituting elements.

The RAM 102 is a random-access memory that operates as the main memory of the CPU 101. The RAM 102 is also able to operate as the temporary storage area of a program or the execution area and the data area of a program.

The ROM 103 is a read-only memory that stores the operation processing procedure of the CPU 101. The ROM 103 includes a program ROM that has recorded therein basic software (OS) as a system program for performing the equipment control of an information processing device and a data ROM that records information or the like necessary for operating a system. Further, the HDD 109 that will be described later, a NAND type flash memory, an SD card, a solid-state drive (SSD), or the like may store these basic software or information instead of the ROM 103.

The NETIF 104 is a network interface. The NETIF 104 performs control to transfer data or diagnoses the connection status between a plurality of information processing devices 1.

The VRAM 105 is a video RAM. The VRAM 105 develops information on a photographing recipe to be displayed on the screen of the LCD 106 and performs the control of the display. The LCD 106 is a liquid crystal display. Another display device such as an organic EL display may be used instead of the LCD 106.

The KBC 107 is a controller that is used to control an input signal from the KB 108. The KB 108 is an external input device that is used to receive an operation from a user. The KB 108 has, for example, a pointing device (such as a keyboard and a mouse) or a touch panel display.

The HDD 109 is a hard disk drive. The HDD 109 stores an application program or various data. Instead of the HDD 109, a NAND type flash memory, an SD card, a solid-state drive (SSD), or the like may store an application program or various data.

The IOD 110 is an external input/output device. For example, the IOD 110 inputs and outputs data to and from a recording medium (removable disk) such as a floppy disk drive, a CD-ROM drive, and an SD card. The IOD 110 is used in reading an application program into or from the IOD 110 or the like.

The storage medium 111 is a recording medium that is attachable to and detachable from the IOD 110. The IOD 110 is able to read data from the attached storage medium 111. The storage medium 111 is, for example, a flexible disk, an external hard disk, an optical recording medium (for example, a CD-ROM), an optical magnetic recording medium (for example, an MO), a semiconductor recording medium (for example, an SD card), or the like. Note that the IOD 110 may store an application program or various data.

The transmission of data between the CPU 101, the RAM 102, the ROM 103, the NETIF 104, the VRAM 105, KBC 107, the HDD 109, and the IOD 110 is performed via the transmission bus 100.

Figure 2:
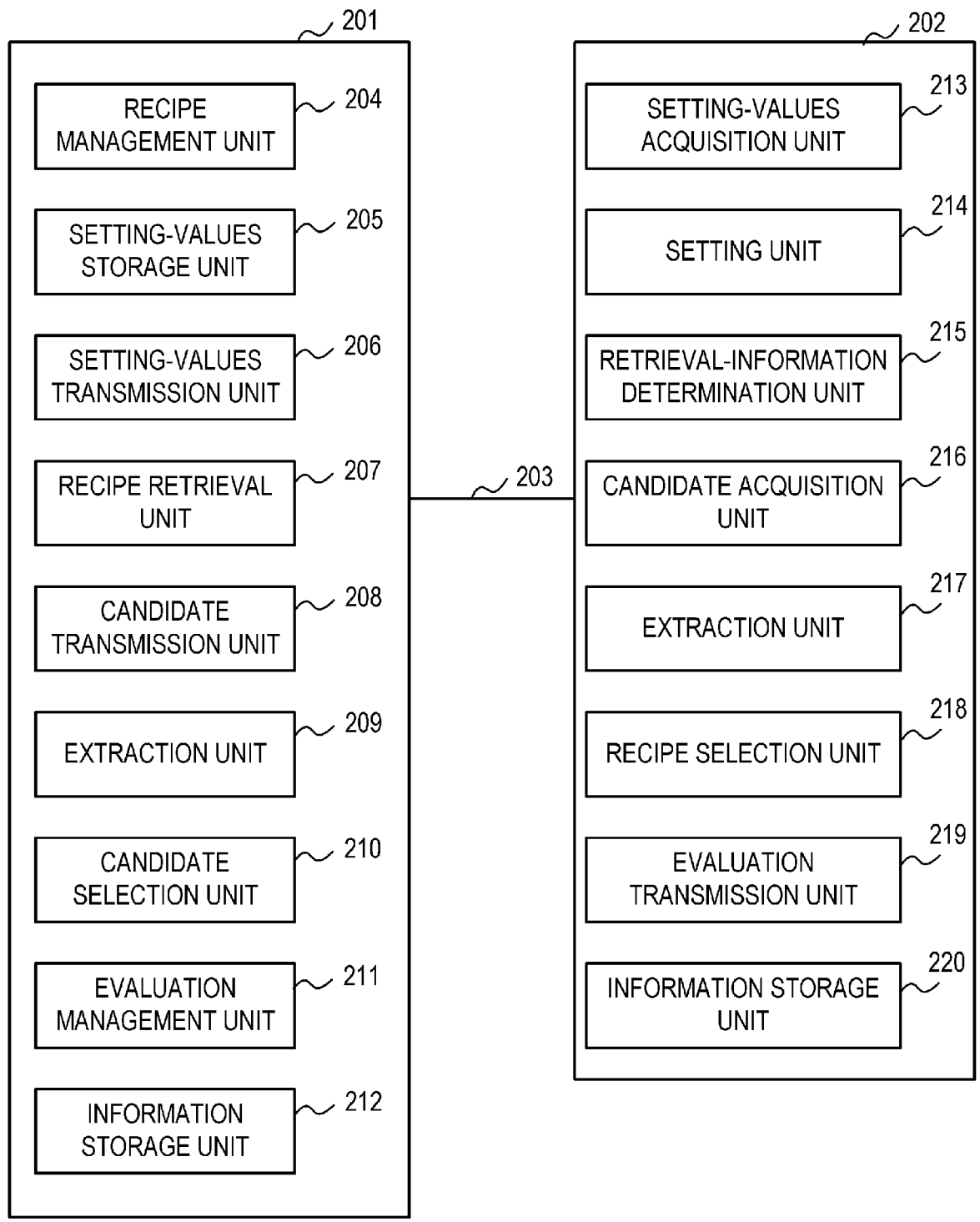
FIG. 2 is a software configuration diagram of the information processing device.

(Software Configuration of Information Processing Device) FIG. 2 is a software configuration diagram of the information processing device 1 that realizes setting-values application processing (processing to apply the relative values of photographing setting values for photographing to a photographing device). The setting-values application processing is realized by a first information processing device 201, a second information processing device 202, and a network 203 that connects the first information processing device 201 and the second information processing device 202 to each other. Each of the first information processing device 201 and the second information processing device 202 is the information processing device 1. The first information processing device 201 and the second information processing device 202 are able to communicate with each other via the network 203.

The first information processing device 201 has various processing modules such as a recipe management unit 204, a setting-values storage unit 205, a setting-values transmission unit 206, a recipe retrieval unit 207, a candidate transmission unit 208, an extraction unit 209, a candidate selection unit 210, and an evaluation management unit 211. The first information processing device 201 has a storage area such as an information storage unit 212.

The second information processing device 202 has various processing modules such as a setting-values acquisition unit 213, a setting unit 214, a retrieval-information determination unit 215, a candidate acquisition unit 216, an extraction unit 217, a recipe selection unit 218, and an evaluation transmission unit 219. The second information processing device 202 has a storage area such as an information storage unit 220.

These processing modules operate when the CPU 101 performs an application program that is read by the ROM 103, the HDD 109, or the IOD 110 and developed into the RAM 102. Further, the information storage unit 212 and the information storage unit 220 are storage areas (storage units) provided in the ROM 103, the HDD 109, the IOD 110, or the RAM 102. The information storage unit 212 and the information storage unit 220 store, for example, information on photographing recipes.

The information processing device 1 and the software configuration (the processing modules and the storage areas) operate as follows. Information or an instruction that has been automatically started or information that has been input by an operator of the information processing device 1 through the KB 108 is developed into the RAM 102 and transmitted to the CPU 101. Then, processing modules necessary for computation and information stored in the storage areas are developed into the RAM 102 from the ROM 103, the HDD 109, the IOD 110, or the like and transmitted to the CPU 101. After that, the CPU 101 performs computation and writes information on the result of the computation in the storage areas where necessary. Further, the CPU 101 simultaneously displays the result of the computation on the LCD 106 through the control of the VRAM 105 where necessary.

Note that respective processing performed by the respective processing modules and the respective storage areas will be described in detail later using the flowchart of FIG. 5.

Figure 3:
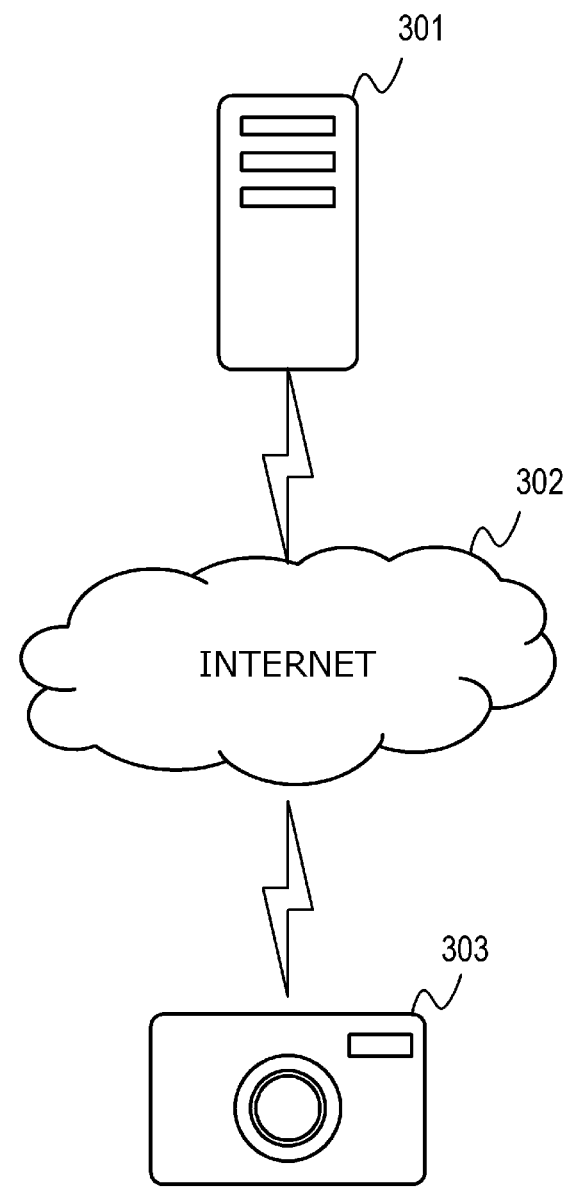
FIG. 3 is an example of a system configuration.

FIG. 3 is an example of the configuration of an entire system according to the present embodiment. A management server 301 manages information on photographing recipes. The management server 301 is an example of the first information processing device 201. An internet 302 is an example of the network 203. A photographing device 303 acquires and displays a content corresponding to an acquisition request when receiving the request for acquiring the content such as an image and a moving image from a user. The photographing device 303 is an example of the second information processing device 202.

The management server 301 has fewer restrictions on its storage capacity or processing performance than the photographing device 303 and is thus able to handle more photographing recipes. Therefore, the management server 301 is able to analyze more contents in a short period of time. The photographing device 303 and the management server 301 transmit and receive a plurality of information (such as information on photographing recipes, photographing setting values, and evaluation information) via the Internet 302.

Figure 4:
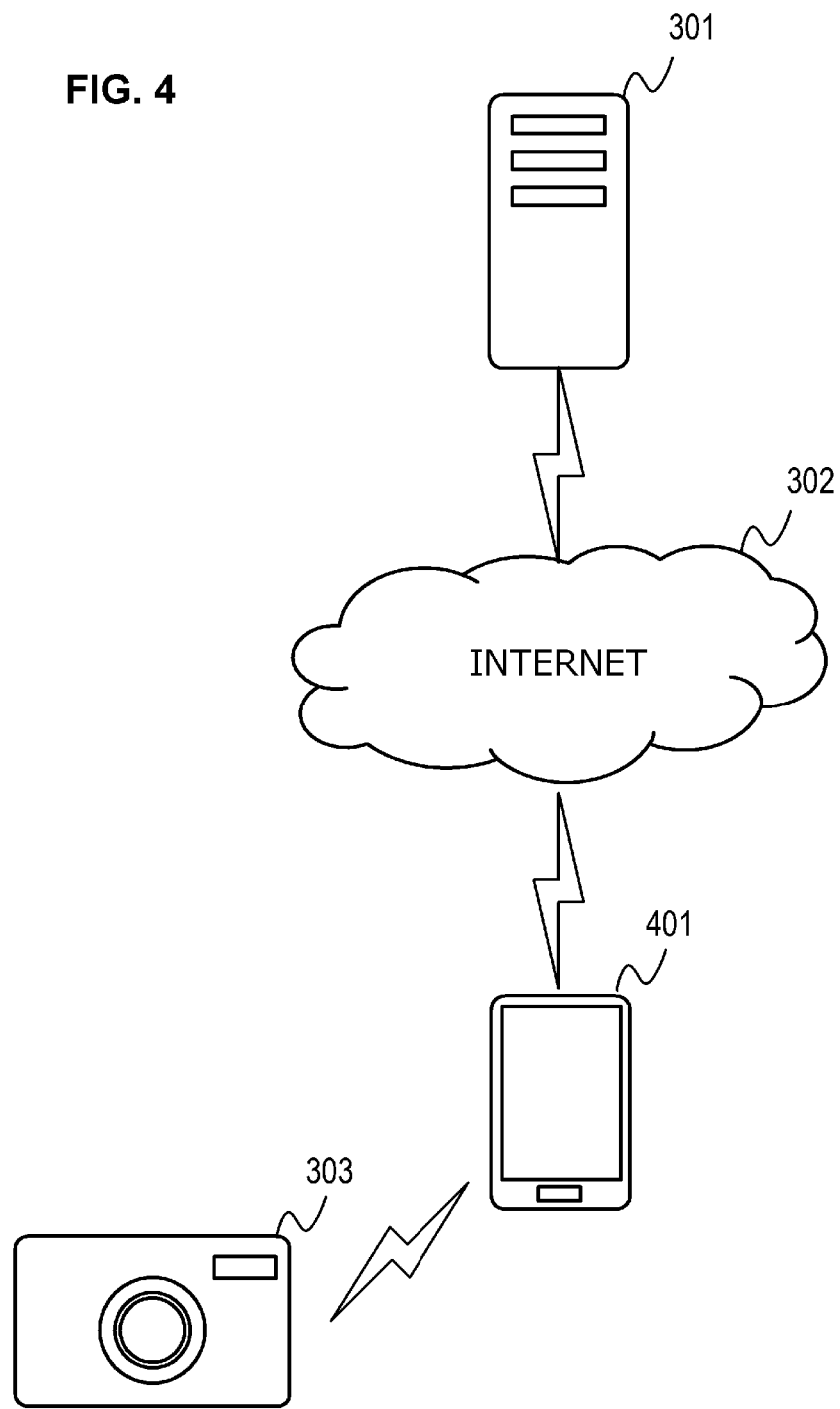
FIG. 4 is an example of the system configuration.

FIG. 4 is another example of the configuration of the entire system according to the present embodiment. A smart phone 401 is an example of the second information processing device 202. Therefore, the photographing device 303 does not correspond to the second information processing device 202 in the present example. The smart phone 401 is connected to the photographing device 303 via a wired cable, a wired network, or a wireless network. The photographing device 303 is not directly connected to the Internet 302. The photographing device 303 transmits and receives information (such as contents and photographing setting values) to and from the management server 301 via the smart phone 401. Further, the smart phone 401 may also operate as a photographing device.

(Setting-values Application Processing) Next, the setting-values application processing (processing to apply the relative values of photographing setting values to a photographing device) will be described in detail with reference to FIG. 5. FIG. 5 is a flowchart illustrating the setting-values application processing. In FIG. 5, steps starting with S1 are processing performed by the first information processing device 201. Steps starting with S2 are processing performed by the second information processing device 202.

Prior to the start of the processing of the flowchart, the recipe management unit 204 of the first information processing device 201 stores information on a plurality of photographing recipes in the information storage unit 212 (performs control to store the information on the plurality of photographing recipes in the information storage unit 212). Then, the setting-values storage unit 205 stores values obtained by converting photographing setting values included in the photographing recipes into relative values so as to correspond to any photographing environment (for example, surrounding brightness and an illumination color) in the information storage unit 212 as relative setting values. Note that persons who have created the photographing recipes set information on the relative setting values together with the information on the photographing recipes and transmit these information to the first information processing device 201 in advance. The plurality of photographing recipes stored in the information storage unit 212 can be information stored by a plurality of users in advance. Further, the relative setting values may be stored in the information storage unit 212 as information included in the photographing recipes, or may be stored in the information storage unit 212 as information different from the photographing recipes. In a case where the photographing recipes include the information on the relative setting values, a user is allowed to refer to the relative setting values as well when referring to the photographing recipes.

Here, in a case where the photographing device photographs objects (subjects) in an auto mode (a mode in which the photographing device automatically determines photographing setting values according to a photographing environment), the relative setting values are values used to correct the photographing setting values set in the auto mode. That is, in a case where the photographing device photographs the objects in the auto mode, values corresponding to the relative setting values are added to or subtracted from the photographing setting values set in the auto mode.

FIG. 7 is a diagram illustrating in detail relative setting values set in advance so as to correspond to photographing recipes. Photographing setting items are items relating to photographing that are settable by relative values. Here, examples of the photographing setting items include an aperture (Av), a shutter speed (Tv), brightness (exposure correction), white balance 1, and white balance 2. Relative setting values are the relative values of the photographing setting values of the respective photographing setting items.

For example, a relative setting value 703 of the aperture (Av) is a value where 3 is assumed as a reference value and is a relative value corresponding to the five levels of "blurring" to "emphasizing." In the example of FIG. 7, the relative setting value 703 is set at 1. Therefore, in a case where photographing is performed according to the relative setting value 703, a value obtained by correcting the value of the aperture (Av) set in the auto mode by two levels to a blurring side is used.

A relative setting value 704 of the shutter speed (Tv) is a value where 3 is assumed as a reference value and is a relative value corresponding to the five levels of "pan" (long) to "stop" (short). For example, in a case where a moving object is required to be photographed without vibration (in its stopped state), the relative setting value 704 may only be set at a value on a "stop" side on which the shutter speed is relatively short. In a case where a moving object is required to be photographed in its moving state, the relative setting value 704 may only be set at a value on a "pan" side on which the shutter speed is relatively long.

Note that in a case where the relative setting value of one of the aperture (Av) and the shutter speed (Tv) is set, the relative setting value of the other of the aperture (Av) and the shutter speed (Tv) may not be set. Specifically, in a case where the relative setting value of one of the aperture (Av) and the shutter speed (Tv) is set, the relative setting value (photographing setting value) of the other of the aperture (Av) and the shutter speed (Tv) is desirably set only by the auto mode of a photographing device. This is because a general user has a difficulty in making settings to realize appropriate exposure even where he/she makes an attempt to set relative setting values in both the aperture (Av) and the shutter speed (Tv).

A relative setting value 705 of the brightness (exposure correction) is a value where 3 is assumed as a reference value and is a relative value corresponding to the five levels of "dark" to "bright." A relative setting value 706 of the white balance 1 is a value where 3 is assumed as a reference value and is a relative value corresponding to the five levels of "blue" to "umber." A relative setting value 707 of the white balance 2 is a value where 3 is assumed as a reference value and is a relative value corresponding to the five levels of "green" to "magenta."

For example, in the photographing setting information 604 of FIG. 6, the photographing mode is set to the Av (aperture priority mode), and the aperture is set at 1.8. In other words, settings in which the aperture is opened to make a background blurred are made. Therefore, in order to express the settings, 1 (a value on the blurring side) is selected in the relative setting value 703 of the aperture (Av) in FIG. 7. The photographing setting items may also include setting items such as the ON/OFF of a flash and the ON/OFF of monochrome photographing, besides the above items. The intensity of the relative setting values is expressed by the five levels in FIG. 7 but may be expressed by other methods. For example, the relative setting values may be expressed by 10 levels or 100 levels. Alternatively, the relative setting values may not be expressed by specific numerical values (such as exposure values and the differences between absolute values with which shutter speeds are used and automatically-determined absolute values) instead of intensity.

In step S2001, the retrieval-information determination unit 215 determines retrieval information and transmits the determined retrieval information to the first information processing device 201. The retrieval information is information used to retrieve photographing recipes (step S1003). The retrieval information is, for example, a photographed image (a still image or a moving image), voice input by a user, or a keyword (a word such as a "vehicle" and a "person"). When a content such as an image and voice is specified by the user at this time, the extraction unit 217 may extract (acquire) object information (information showing an object to be photographed) from the content and the retrieval-information determination unit 215 may determine the object information as retrieval information. Note that the first information processing device 201 may extract object information in step S1003 as well. However, the second information processing device 202 may extract object information as described above. Note that processing (object extraction processing) to extract object information will be described in detail later using FIG. 9.

In step S1002, the recipe retrieval unit 207 receives the retrieval information on photographing recipes from the second information processing device 202.

In step S1003, the recipe retrieval unit 207 retrieves photographing recipes (at least one photographing recipe) corresponding to the retrieval information from a plurality of photographing recipes stored in the information storage unit 212 and acquires the retrieved photographing recipes as retrieval results. For example, when the retrieval information is information showing a keyword "vehicle," the recipe retrieval unit 207 retrieves photographing recipes including the keyword "vehicle." In a case where the retrieval information on the photographing recipes includes a content (such as a still image, a moving image, or voice) at this time, the extraction unit 209 may extract object information from the content and use the extracted object information for retrieval. Note that recipe retrieval processing to retrieve photographing recipes will be described in detail later using FIG. 8.

In step S1004, the candidate selection unit 210 selects photographing recipes in according with preference information showing the preference of the user as candidates for an application recipe (one or a plurality of candidates for a photographing recipe corresponding to setting values applied to a photographing device) from among the retrieval results. For example, the candidate selection unit 210 selects photographing recipes with respect to which the user has registered a "like" in advance as candidates for the application recipe. Note that when the number of the photographing recipes included in the retrieval results is a prescribed number or less (for example, 3 or less), the candidate selection unit 210 may not perform the processing to select the photographing recipes corresponding to the preference information. In this case, the candidate selection unit 210 may select all the photographing recipes included in the retrieval results as the candidates for the application recipe. Note that the processing to select candidates for an application recipe (candidate selection processing) will be described in detail later using FIG. 10.

In step S1005, the candidate transmission unit 208 transmits the candidates for the application recipe to the second information processing device 202.

In step S2006, the candidate acquisition unit 216 receives (acquires) the candidates for the application recipe from the first information processing device 201.

In step S2007, the recipe selection unit 218 selects one candidate as the application recipe from among the candidates for the application recipe. For example, a table (FIG. 10) showing the candidates for the application recipe rearranged according to preference information is displayed on the LCD 106, and the user performs an input to select one of the candidates with respect to the second information processing device 202 (KB 108). Then, the recipe selection unit 218 selects the candidate for the application recipe corresponding to the user's input as the application recipe.

In step S2008, the recipe selection unit 218 transmits information (selection result) showing the selected application recipe to the first information processing device 201.

In step S1009, the recipe management unit 204 receives the selection result from the second information processing device 202. Then, the recipe management unit 204 acquires the relative values (relative setting values) of the photographing setting values of the application recipe corresponding to the selection result from the information storage unit 212 (storage device).

In step S1010, the setting-values transmission unit 206 transmits the relative setting values of the application recipe to the second information processing device 202.

In step S2011, the setting-values acquisition unit 213 receives (acquires) the relative setting values of the application recipe from the first information processing device 201.

In step S2012, the setting unit 214 applies the relative setting values of the application recipe to the photographing device (the photographing device 303 of FIGS. 3 and 4). Application processing that is processing to apply relative setting values to the photographing setting values of a photographing device will be described in detail later using FIGS. 11 and 12.

In step S2013, the evaluation transmission unit 219 transmits the recipe evaluation of the application recipe to the first information processing device 201 after photographing by the photographing device to which the relative setting values are applied. Note that the recipe evaluation of the application recipe (photographing recipe) is input by the user according to evaluation registration processing (evaluation registration operation) after the photographing by the photographing device to which the relative setting values are applied. The evaluation registration processing will be described in detail later using FIG. 13.

In step S1014, the evaluation management unit 211 receives (acquires) the recipe evaluation of the application recipe from the second information processing device 202. Then, the evaluation management unit 211 updates the evaluation information 607 stored in the information storage unit 212 using the recipe evaluation. Thus, the evaluation information 607 of a photographing recipe is updated for each photographing. Therefore, the user is allowed to select a photographing recipe (application recipe) for photographing in S2007 referring to information input by many photographers.

Figure 5:
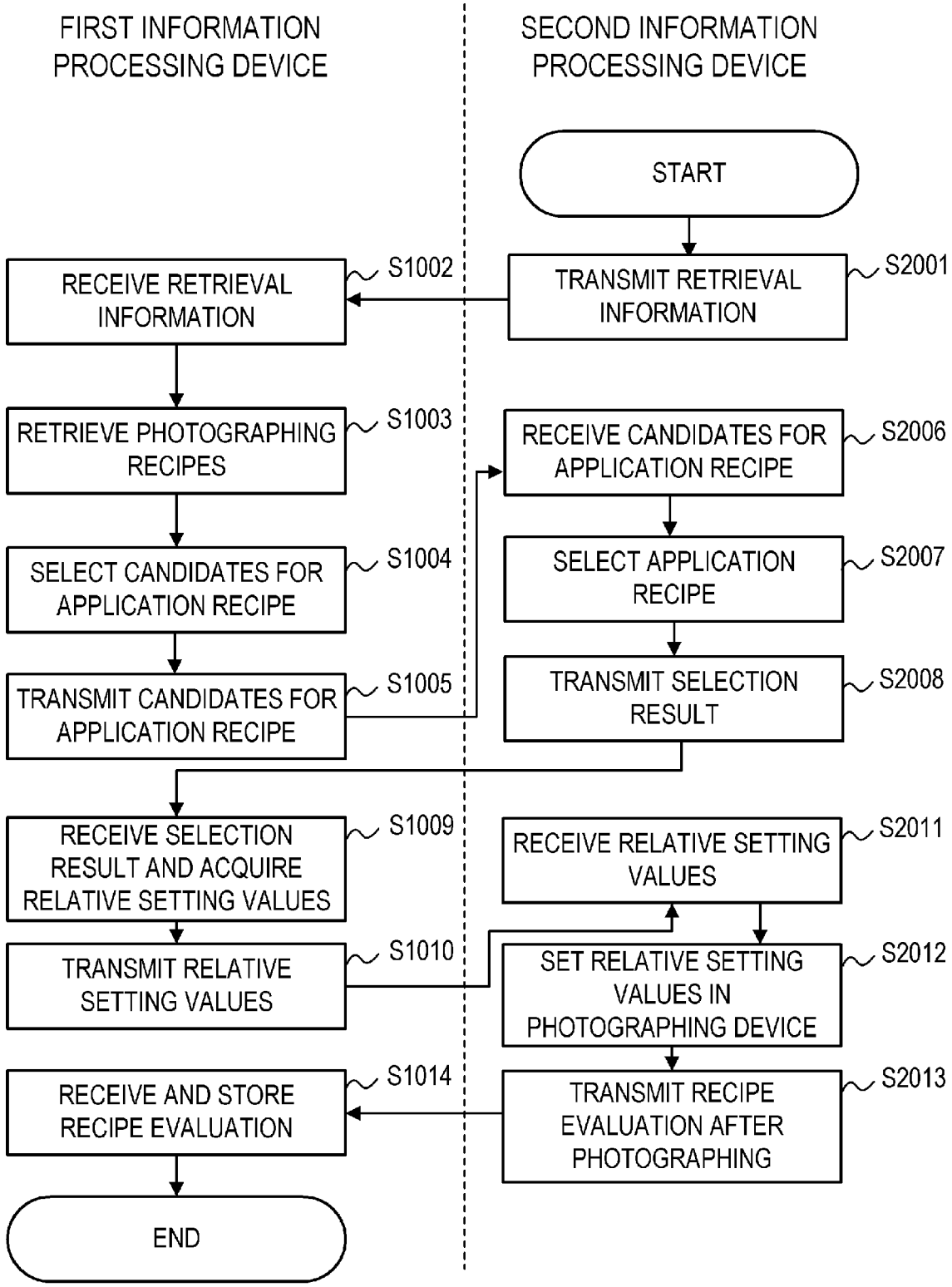
FIG. 5 is a flowchart showing setting-values application processing.

Here, the two devices of the first information processing device 201 and the second information processing device 202 perform the processing shown in FIG. 5 in a shared manner like the configuration of FIG. 3, but one information processing device 1 may perform all the processing shown in FIG. 5. Further, like the configuration of FIG. 4, three or more information processing devices may perform the processing shown in FIG. 5 in a shared manner with the smart phone 401 and the photographing device 303 separated from each other. Further, in a case where the smart phone 401 includes a photographing device, in step S2001, the smart phone 401 may photograph an image to be used as retrieval information for retrieving photographing recipes and transmit the photographed image as the retrieval information. Further, in step S2012, the smart phone 401 may apply the relative setting values of a photographing recipe to the photographing device 303 or a photographing device included in the smart phone 401.

(Recipe Retrieval Processing: Step S1003) Next, the recipe retrieval processing performed by the recipe retrieval unit 207 in step S1003 will be described using FIG. 8. As an example of the recipe retrieval processing, a method (keyword retrieval) for selecting photographing recipes to be retrieved that have text information partially matching retrieval information (text information) showing a retrieval keyword will be described.

Here, as shown in FIG. 6 described above, the photographing recipes include the photographing procedure 602, the photographing tricks 603, the photographing setting information 604, the category 605, the photographing-recipe evaluation information 606, and the post-photographing evaluation information 607.

Figure 8:
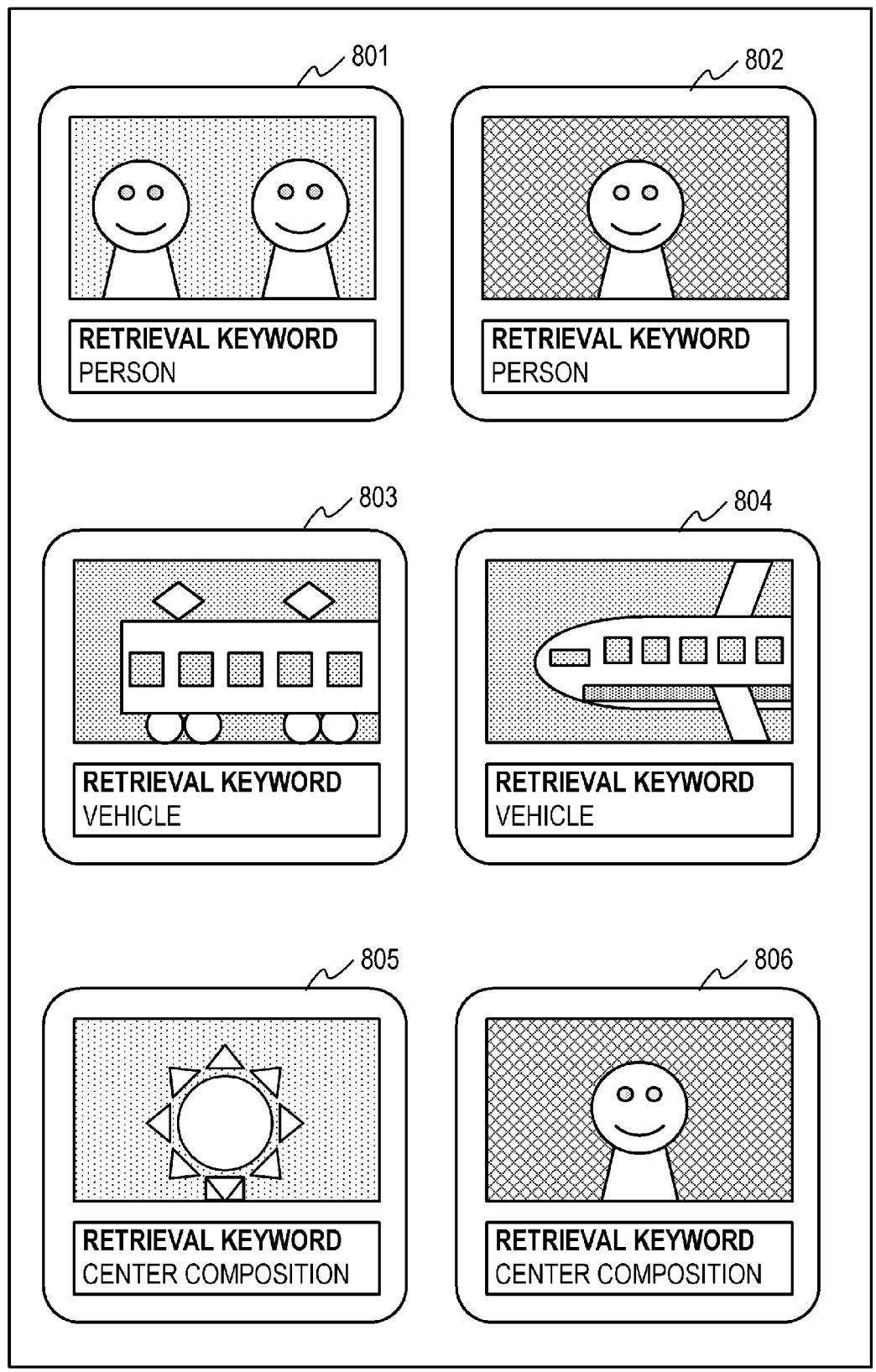
FIG. 8 is a diagram illustrating recipe retrieval processing.

FIG. 8 is a diagram illustrating the recipe retrieval processing in detail. For example, photographing recipes 801 and 802 included in retrieval results are photographing recipes including a word "person." Therefore, the photographing recipes 801 and 802 are obtained when retrieval is performed using a "person" as a retrieval keyword. That is, since a part of the information of the photographing recipes (for example, a part of the photographing procedure 602) matches the retrieval keyword, the photographing recipes are obtained as the retrieval results.

Photographing recipes 803 and 804 are examples of photographing recipes obtained when a "vehicle" is input as a retrieval keyword. Photographing recipes 805 and 806 are examples of photographing recipes obtained when "center composition" is input as a retrieval keyword.

Here, a keyword retrieval is described. However, other retrieval methods such as retrieval for acquiring photographing recipes of a specified category and retrieval for acquiring photographing recipes of an image photographed using the same camera or lens as that of a photographing device may be used. Further, besides a method for retrieving photographing recipes including a word partially matching a keyword, photographing recipes including a word associated with the keyword may be retrieved. In addition, photographing recipes may be retrieved through the comparison between the photographing recipes and retrieval information according to other retrieval methods (comparison methods) such as similarity retrieval using the feature amounts of images and similarity retrieval using the histogram of colors.

(Subject Extraction Processing: Step S2001) Next, the object extraction processing (processing to extract object information from a content) that can be performed by the extraction unit 209 (or the extraction unit 217) in step S2001 (or step S1003) will be described using FIG. 9. After the object extraction processing is performed, information based on a content (such as a still image, a moving image, and voice) becomes available for retrieving photographing recipes. Here, for example, if an object (subject) in the content is the same as an object photographed after the application of relative setting values, information on the object photographed after the application of the relative setting values becomes available for retrieval. Therefore, it is possible to retrieve photographing recipes more suitable for an environment at photographing in the recipe retrieval processing of step S1003. Further, in a case where a live-view image (an image photographed by a photographing device or a smart phone in real time) is used as a content to be objected to the object extraction processing, a user may only photograph an object required to be photographed using relative setting values in advance. In this case, the user eliminates the labor of thinking about a retrieval keyword used in the recipe retrieval processing. Therefore, it is possible to suitably perform the recipe retrieval processing while reducing the labor of the user.

Figure 9:
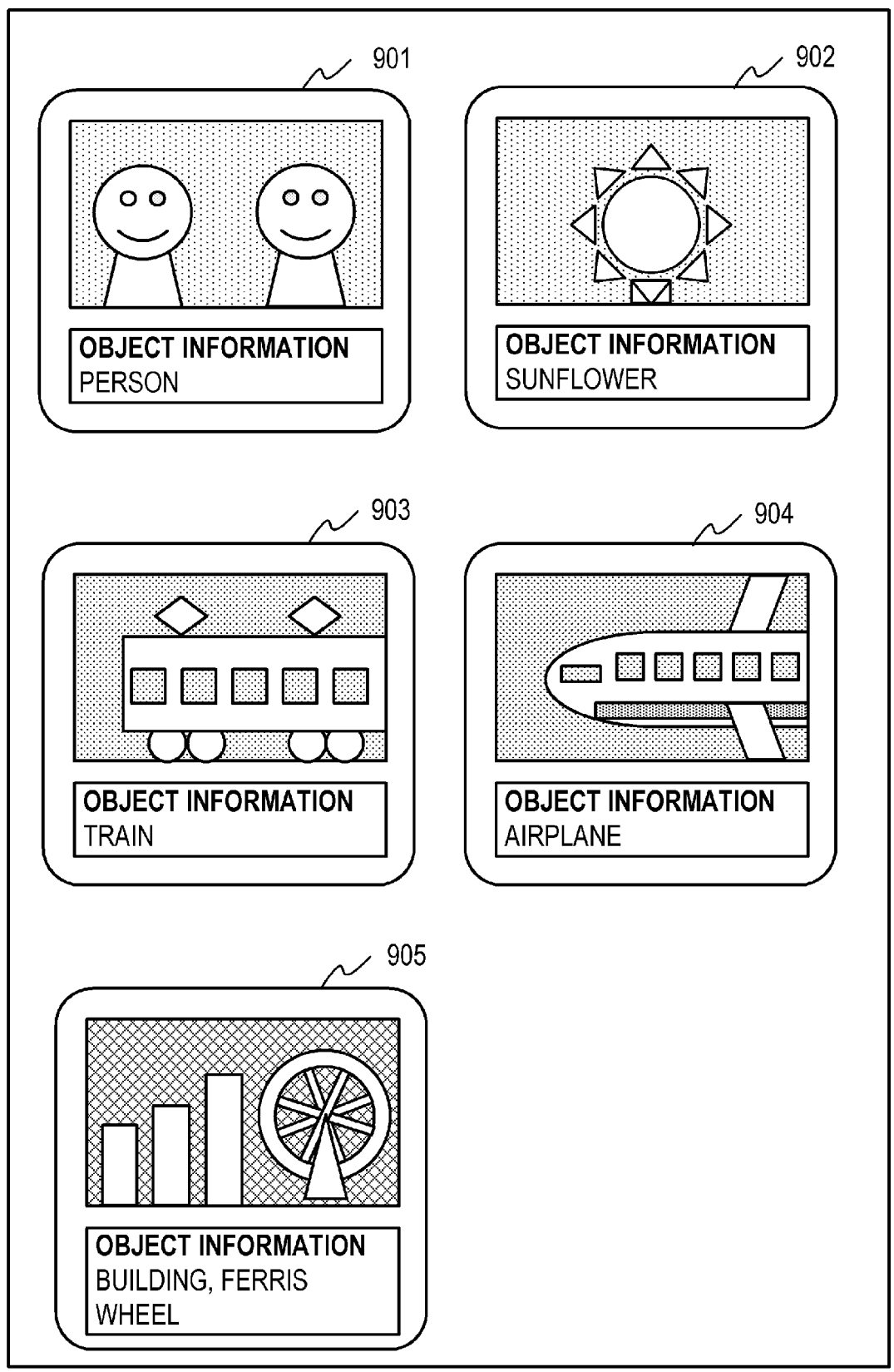
FIG. 9 is a diagram illustrating object extraction processing.

FIG. 9 is a diagram illustrating the object extraction processing in detail. Here, a case where object information is extracted (acquired) from an image will be described. In a case where the extraction unit 209 (or the extraction unit 217) extracts object information from an image, the extraction unit 209 (or the extraction unit 217) applies image recognition processing to the image to extract the object information. As the image recognition processing, general estimation processing based on feature amounts or estimation processing based on machine learning of images may be used.

An extraction result 901 is an extraction result based on the image recognition processing and includes language information showing a "person" as object information. Similarly, an extraction result 902 includes language information showing a "sunflower" as object information, and an extraction result 903 includes language information showing a "train" as object information. An extraction result 904 includes language information showing an "airplane" as object information. An extraction result 905 includes language information showing a "building" as first object information and language information showing a "Ferris wheel" as second object information.

The extraction unit 209 (or the extraction unit 217) may extract a plurality of object information like the extraction result 905. Using these object information as the retrieval keywords described in FIG. 8, it is possible to retrieve photographing recipes. Here, the object information is extracted from still images and used for keyword retrieval. However, object information may be extracted from frames of moving images. Further, voice may be converted into language information by voice recognition processing and used as object information. In addition, the extraction unit 209 may perform the object extraction processing on images of photographing recipes as well and maintain object information thus obtained as information on the photographing recipes. In this case, the recipe retrieval unit 207 may retrieve photographing recipes through the comparison between the object information extracted from the images of the photographing recipes and object information extracted from retrieval information.

Note that the extraction unit 209 or the extraction unit 217 may extract background information or environment information (for example, information indicating that photographing is being performed inside a room or information indicating that a baseball is being played) from images instead of the object extraction processing. In this case, the recipe retrieval unit 207 may retrieve photographing recipes associated with the extracted background information or environment information.

(Candidate Selection Processing: Step S1004) The candidate selection processing performed in step 51004 will be described in detail using FIG. 10. FIG. 10 is an example of arranging retrieval results, which are obtained when a user as a photographer has performed keyword retrieval using "person" as a keyword, in order of the preference of the user. For example, the candidate selection unit 210 selects upper five photographing recipes (in a prescribed order or more) as candidates for an application recipe from among photographing recipes included in the retrieval results rearranged in order of the preference of the user.

A photographing recipe name 1101 shows the names of photographing recipes including a "person" as a keyword. A registration status 1102 of a "like," a registration status 1103 of a "bookmark," and a follow status 1104 to a creator are preference information showing the preference of the user for the photographing recipes. The preference information is information that has been set by the user with respect to the respective photographing recipes and is information that has been stored in the information storage unit 212. The registration status 1102 of a "like" shows whether the user has registered a "like" with respect to the photographing recipes. The registration status 1103 of a "bookmark" shows whether the user has registered a "bookmark" with respect to the photographing recipes. For example, when the user has registered at least one of a "like" and a "bookmark" with respect to a certain photographing recipe, it may be determined that the photographing recipe suits the preference of the user. On the other hand, when the user has not registered both a "like" and a "bookmark" with respect to a certain photographing recipe, it may be determined that the photographing recipe does not suit the preference of the user. The follow status 1104 to a creator shows whether the user has followed the creators of the photographing recipes (whether a follow setting has been made).

Note that the preference of the photographing recipes is determined, for example, in order of the registration status 1103, the registration status 1102, and the follow status 1104. That is, it is determined that the photographing recipes with respect to which the user has registered a "bookmark" suit the preference of the user at the highest level, the photographing recipes with respect to which the user has registered a "like" suit the preference at the second-highest level, and the photographing recipes with respect to which the user has followed creators suit the preference at the third-highest level. For example, the candidate selection unit 210 assigns 4 points when the user has registered a "bookmark," assigns 2 points when the user has registered a "like," and assigns 1 point when the user has followed the creators. The candidate selection unit 210 may determine that the photographing recipes suit the preference of the user at a higher level as their total points are higher. The candidate selection unit 210 determines the total points as evaluation points and evaluates the respective photographing recipes below.

For example, with respect to a photographing recipe 1105 of "person portrait photographing" set in the highest row (first row) as a photographing recipe most suiting the preference, the user has registered a "like" and a "bookmark." Further, the user has followed the creator of the photographing recipe 1105. Therefore, the evaluation point of the photographing recipe 1105 is 7 points.

With respect to a photographing recipe 1106 of "how to photograph a child" set in the second place in order of the preference of the photographing recipes, the user has registered a "like" and a "bookmark." Further, the user has not followed the creator of the photographing recipe 1106. The evaluation point of the photographing recipe 1106 is 6 points.

With respect to a photographing recipe 1107 of "stopping an object in a sports day" set in the third place in order of the preference of the photographing recipes, the user has not registered a "like" and has registered a "bookmark." Further, the user has not followed the creator of the photographing recipe 1107. The evaluation point of the photographing recipe 1107 is 4 points.

With respect to a photographing recipe 1108 of "photographing a graduation ceremony" set in the fourth place in order of the preference of the photographing recipes, the user has registered a "like" and has not registered a "bookmark." Further, the user has not followed the creator of the photographing recipe 1108. The evaluation point of the photographing recipe 1108 is 2 points.

With respect to a photographing recipe 1109 of "how to photograph making use of a background" set in the fifth place in order of the preference of the photographing recipes, the user has not registered a "like" and a "bookmark." Further, the user has followed the creator of the photographing recipe 1109. The evaluation point of the photographing recipe 1109 is 1 point.

With respect to a photographing recipe 1110 of a "baseball batting scene" set in the sixth place in order of the preference of the photographing recipes, the user has not registered a "like" and a "bookmark." Further, the user has not followed the creator of the photographing recipe 1110. The evaluation point of the photographing recipe 1110 is 0 point.

In step S1004, the candidate selection unit 210 selects photographing recipes in a prescribed order or more (a prescribed number of photographing recipes in descending order of evaluation points) as candidates for an application recipe from among photographing recipes rearranged in order of the preference of the user and included in the retrieval results. Note that the candidate selection unit 210 may select photographing recipes of which the evaluation point is a prescribed point or more (a prescribed value or more) as candidates for an application recipe. In addition, the candidate selection unit 210 may select photographing recipes of which the total of "the number of photographing times," "likes," and "bookmarks" of the evaluation information 606 is a prescribed number or more as candidates for an application recipe from among photographing recipes selected according to preference information.

Further, in step 51004, the candidate selection unit 210 may select one photographing recipe having the highest evaluation point as an application recipe. In this case, the processing of steps S1004, S1005, and S2006 to S2008 is not performed, and then the recipe management unit 204 acquires the relative setting values of the application recipe from the information storage unit 212 in step S1009.

Further, in step S2007, a table similar to FIG. 10 in which candidates for an application recipe selected by the candidate selection unit 210 are rearranged in the order of the preference (for example, a table showing photographing recipes of which the evaluation point is 2 or more among the photographing recipes of FIG. 10) may be displayed on the LCD 106. In this case, the user may refer to the table in which the candidates for the application recipe are rearranged and perform an input to select one application recipe from among the plurality of candidates for the application recipe. Then, the recipe selection unit 218 may select the one candidate as the application recipe from among the plurality of candidates for the application recipe according to the input of the user.

In addition, in step S2007, the recipe selection unit 218 may make a proposal to the user to use a candidate for an application recipe having the highest evaluation point as the application recipe. When the proposal is approved by the user, the recipe selection unit 218 may select the candidate for the application recipe as the application recipe. On the other hand, when the proposal is not approved by the user, the recipe selection unit 218 may make a proposal to the user to use a candidate for the application recipe having the second-highest evaluation point as the application recipe. In this manner, the recipe selection unit 218 may repeatedly make a proposal to the user to use a candidate for the application recipe in descending order of evaluation points until the proposal is approved by the user and select the candidate for the application recipe approved by the user as the application recipe. Note that the recipe selection unit 218 may select a candidate for the application recipe having the highest evaluation point as the application recipe regardless of the input of the user.

(Application Processing: Step S2012) Next, the application processing performed by the setting unit 214 in step S2012 will be described using FIGS. 11 and 12. The setting unit 214 sets relative setting values shown in FIGS. 11, 12, or the like in the photographing device. In a case where the photographing device performs photographing using the auto mode as a photographing mode, the photographing device corrects photographing setting values set in the auto mode on the basis of relative setting values and performs the photographing in accordance with the corrected photographing setting values.

FIG. 11 is a table showing the relative setting values of the photographing recipe of person portrait. FIG. 11 is a diagram illustrating an example of applying the relative setting values (the relative values of the photographing setting items) shown in FIG. 7 to the photographing device. Photographing setting items 1201 are items settable in the photographing device. Relative setting values 1202 are the relative values of the respective photographing setting values.

In FIG. 11, a relative setting value 1203 of an aperture (Av) is set at 1 so as to have maximum blur. A relative setting value 1204 of a shutter speed (Tv) is not set since the relative setting value 1203 of the aperture (Av) is set. A relative setting value 1205 of brightness (exposure correction) is set at 3. A relative setting value 1206 of white balance 1 is set at 4. A relative setting value 1207 of white balance 2 is set at 4.

With the relative setting values shown in FIG. 11 set in the photographing device, the photographing device makes, when performing photographing in the auto mode, its aperture opened by two levels and its white balance adjusted to an umber side and a magenta side by one level than photographing in the normal auto mode.

Figure 12:
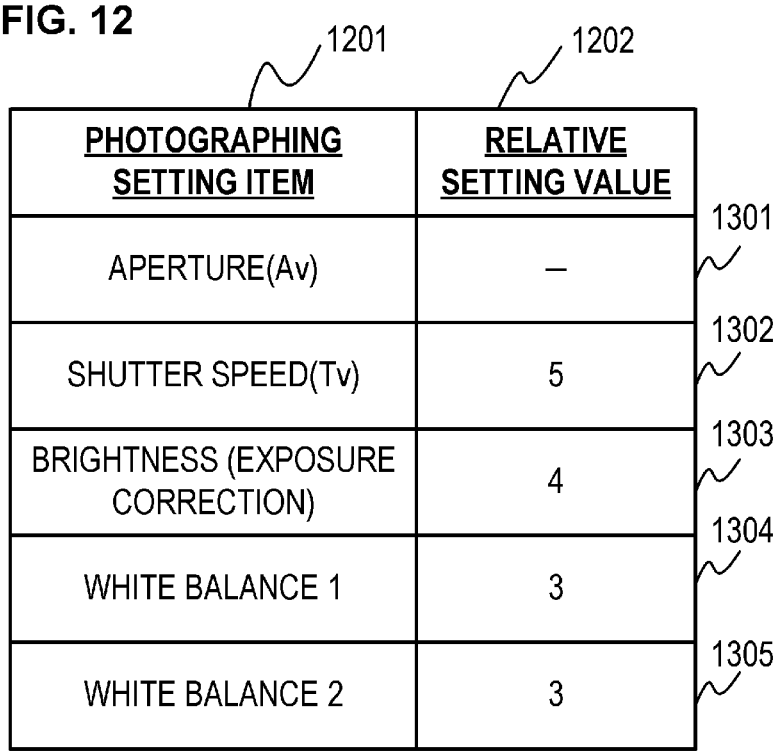
FIG. 12 is a diagram illustrating the application processing.

FIG. 12 is a table showing the relative setting values of photographing recipes for photographing an object without vibration inside a room. A relative setting value 1301 of an aperture (Av) is not set since a relative setting value 1302 of a shutter speed (Tv) is set. The relative setting value 1302 of the shutter speed (Tv) is set at 5. A relative setting value 1303 of brightness (exposure correction) is set at 4. A relative setting value 1304 of white balance 1 is set at 3. A relative setting value 1305 of white balance 2 is set at 3.

Therefore, with the relative setting values shown in FIG. 12 set in the photographing device, the photographing device makes, when performing photographing in the auto mode, its shutter speed faster by two levels and its brightness (exposure) brighter by one level than photographing in the normal auto mode.

Figure 13:
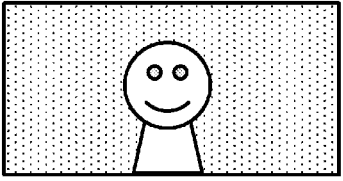
FIG. 13 is a diagram illustrating evaluation registration processing.

(Evaluation Registration Processing) FIG. 13 is a diagram illustrating in detail the evaluation registration processing that is processing to register a recipe evaluation by the user after performing photographing according to relative setting values prior to the transmission of the recipe evaluation to the first information processing device 201 in step S2013. The user inputs the result of the photographing using the relative setting values corresponding to a photographing recipe to the second information processing device 202 (a photographing device or a smart phone) as the recipe evaluation of the photographing recipe. Then, the first information processing device 201 (the management server 301)

receives the recipe evaluation from the second information processing device 202 and updates the evaluation information 607 on the photographing recipe so as to reflect the recipe evaluation.

A photographing-recipe evaluation item 1401 may include a comprehensive evaluation showing a total evaluation, a difficulty in (performing photographing) according to a photographing recipe, reproducibility (photographing reproducibility) showing whether photographing according to a photographing recipe has been successfully performed, satisfaction with a photographing result, and the accuracy of an article about a photographing recipe. For evaluation values 1402 of photographing-recipe evaluation items, the user sets an evaluation value for each of the photographing-recipe evaluation items. The evaluation values 1402 are expressed according to a five-grade evaluation. As the evaluation values 1402, the respective evaluation values of the photographing-recipe evaluation items 1401 are expressed as 5 when the evaluations of the photographing-recipe evaluation items 1401 are the highest, expressed as 1 when the evaluations of the photographing-recipe evaluation items 1401 are the lowest, expressed as 3 when the evaluations of the photographing-recipe evaluation items 1401 are average.

In FIG. 13, an evaluation value 1403 of the comprehensive evaluation is set at 5. An evaluation value 1404 of the difficulty is set at 2. An evaluation value 1405 of the reproducibility is set at 5. An evaluation value 1406 of the satisfaction is set at 4. An evaluation value 1407 of the accuracy of an article is set at 3.

Note that the user is also allowed to register a photographer's comment 1408 and a photographer's photographing image 1409 as recipe evaluations, besides the evaluation values.

In this manner, the evaluation values, the comment, and the photographing image of a photographing recipe that have been actually used for photographing are consolidated as a recipe evaluation. Therefore, other users are allowed to refer to the recipe evaluation when selecting a photographing recipe (the processing of step S2007).

According to the present embodiment, an information processing device sets the relative values (relative setting values) of the photographing setting values of a photographing recipe corresponding to retrieval information in a photographing device. Using the relative values like this, the information processing device is able to perform appropriate photographing settings in the photographing device even where a photographing environment is different between photographing of an image of a photographing recipe and photographing by the user. Therefore, the user is allowed to easily acquire a photographing image expressed like an image of the photographing recipe.

Note that an image (a still image or a moving image) is used as a content acquired according to a photographing recipe in the present embodiment but other contents such as voice and text may be used.

According to the present invention, the user is allowed to easily acquire a photographing image expressed like a certain image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-116969, filed on Jul. 15, 2021, which is hereby incorporated by reference herein in its entirety.

What is claimed is:

1. An information processing device comprising at least one memory and at least one processor which function as:
   a determination unit configured to determine retrieval information used to retrieve at least one photographing recipe including information on photographing;
   a selection unit configured to 1) determine an evaluation point corresponding to preference information showing preference of a user for each of the at least one photographing recipe retrieved on the basis of the retrieval information, and 2) select a prescribed number of photographing recipes in descending order of the evaluation point or at least one photographing recipe of which the evaluation point is a prescribed value or more;
   an acquisition unit configured to acquire relative setting values representing relative values of photographing setting values, corresponding to one of the at least one photographing recipe selected by the selection unit according to the preference information; and
   a setting unit configured to set a photographing device to perform photographing on a basis of the relative setting values.

2. The information processing device according to claim 1, wherein, in a case where the photographing device is set to perform photographing on the basis of the relative setting values, the photographing device 1) corrects photographing setting values set to perform photographing in an auto mode according to the relative setting values, and 2) performs photographing in accordance with the corrected photographing setting values.

3. The information processing device according to claim 1, further comprising a display device configured to display information obtained by further rearranging photographing recipes, which have been selected according to the preference information, according to the preference information, wherein
the acquisition unit acquires the relative setting values corresponding to one photographing recipe selected by the user from the photographing recipes selected according to the preference information.

4. The information processing device according to claim 1, wherein the preference information includes at least one of information showing whether the user likes photographing recipes, information showing whether the user has registered storage destinations of photographing recipes, and information showing whether the user has followed creators of photographing recipes.

5. The information processing device according to claim 1, wherein the retrieval information includes a keyword, a still image, a moving image, or voice.

6. The information processing device according to claim 5, wherein the at least one memory and the at least one processor further function as a second acquisition unit configured to perform image recognition processing on a live-view image photographed by the photographing device or the information processing device to acquire object information, representing a keyword showing an object, from the live-view image, wherein
the determination unit determines the object information as the retrieval information.

7. The information processing device according to claim 5, wherein the at least one memory and the at least one processor further function as a second acquisition unit configured to perform voice recognition processing on voice input by a user to acquire object information, representing a keyword showing an object, from the voice, wherein
the determination unit determines the object information as the retrieval information.

8. The information processing device according to claim 1, wherein the photographing setting values 1) are values associated with setting items of the photographing device, and 2) include values associated with at least one of setting items of an aperture, a shutter speed, exposure, and white balance.

9. The information processing device according to claim 1, wherein each of the at least one photographing recipe retrieved on a basis of the retrieval information includes an evaluation for the photographing recipe.

10. The information processing device according to claim 9, wherein the evaluation includes at least one of a difficulty in photographing, reproducibility of photographing, satisfaction, accuracy of an article, and a comment.

11. The information processing device according to claim 1, further comprising:
a storage device configured to store a plurality of photographing recipes and a plurality of the relative setting values corresponding to the plurality of photographing recipes; and
wherein the at least one memory and the at least one processor further function as a retrieval unit configured to retrieve the at least one photographing recipe on a basis of the retrieval information from the plurality of photographing recipes stored in the storage device.

12. The information processing device according to claim 1, wherein
the information processing device is communicable with a second information processing device that stores a plurality of photographing recipes and the relative setting values corresponding to the plurality of photographing recipes, wherein the determination unit transmits the retrieval information to the second information processing device, and
the acquisition unit acquires the relative setting values corresponding to one of the at least one photographing recipe retrieved on the basis of the retrieval information, from the second information processing device.

13. The information processing device according to claim 1, wherein the information processing device includes the photographing device.

14. An information processing device comprising at least one memory and at least one processor which function as:
a control unit configured to perform control to store in a storage device 1) a plurality of photographing recipes each including information on photographing and 2) a plurality of relative setting values that represent relative values of photographing setting values and that correspond to the plurality of photographing recipes;
a retrieval unit configured to acquire retrieval information used for retrieval and retrieves at least one photographing recipe on a basis of the retrieval information from the plurality of photographing recipes stored in the storage device;
a selection unit configured to 1) determine an evaluation point corresponding to preference information showing preference of a user for each of the at least one photographing recipe retrieved on the basis of the retrieval information, and 2) select a prescribed number of photographing recipes in descending order of the evaluation point or at least one photographing recipe of which the evaluation point is a prescribed value or more;
an acquisition unit configured to acquire relative setting values representing relative values of photographing setting values, corresponding to one of the at least one photographing recipe selected by the selection unit according to the preference information; and
a transmission unit configured to transmit the relative setting values acquired by the the acquisition unit, to a second information processing device that sets a photographing device to perform photographing on a basis of the relative setting values.

15. An information processing method comprising:
a step of determining retrieval information used to retrieve at least one photographing recipe including information on photographing;
a step of 1) determining an evaluation point corresponding to preference information showing preference of a user for each of the at least one photographing recipe retrieved on the basis of the retrieval information, and 2) selecting a prescribed number of photographing recipes in descending order of the evaluation point or at least one photographing recipe of which the evaluation point is a prescribed value or more;
a step of acquiring relative setting values representing relative values of photographing setting values, corresponding to one of the at least one photographing recipe selected in the step of selecting according to the preference information; and
a step of setting a photographing device to perform photographing on a basis of the relative setting values.

16. An information processing method comprising:
a step of performing control to store in a storage device a plurality of photographing recipes each including information on photographing and a plurality of relative setting values that represent relative values of photographing setting values and that correspond respectively to the plurality of photographing recipes;

a step of acquiring retrieval information used for retrieval and retrieving at least one photographing recipe on a basis of the retrieval information from the plurality of photographing recipes stored in the storage device;

a step of 1) determining an evaluation point corresponding to preference information showing preference of a user for each of the at least one photographing recipe retrieved on the basis of the retrieval information, and 2) selecting a prescribed number of photographing recipes in descending order of the evaluation point or at least one photographing recipe of which the evaluation point is a prescribed value or more;

a step of acquiring relative setting values representing relative values of photographing setting values, corresponding to one of the at least one photographing recipe selected in the step of selecting according to the preference information; and a step of transmitting the relative setting values acquired in the step of acquiring to a second information processing device that sets a photographing device to perform photographing on a basis of the relative setting values.

17. A non-transitory computer readable medium that stores a program, wherein the program causes a computer to execute an information processing method comprising:

a step of determining retrieval information used to retrieve at least one photographing recipe including information on photographing;

a step of 1) determining an evaluation point corresponding to preference information showing preference of a user for each of the at least one photographing recipe retrieved on the basis of the retrieval information, and 2) selecting a prescribed number of photographing recipes in descending order of the evaluation point or at least one photographing recipe of which the evaluation point is a prescribed value or more;

a step of acquiring relative setting values representing relative values of photographing setting values, corresponding to one of the at least one photographing recipe selected in the step of selecting according to the preference information; and a step of setting a photographing device to perform photographing on a basis of the relative setting values.

18. A non-transitory computer readable medium that stores a program, wherein the program causes a computer to execute an information processing method comprising:

a step of performing control to store in a storage device a plurality of photographing recipes each including information on photographing and a plurality of relative setting values that represent relative values of photographing setting values and that correspond respectively to the plurality of photographing recipes;

a step of acquiring retrieval information used for retrieval and retrieving at least one photographing recipe on a basis of the retrieval information from the plurality of photographing recipes stored in the storage device;

a step of 1) determining an evaluation point corresponding to preference information showing preference of a user for each of the at least one photographing recipe retrieved on the basis of the retrieval information, and 2) selecting a prescribed number of photographing recipes in descending order of the evaluation point or at least one photographing recipe of which the evaluation point is a prescribed value or more;

a step of acquiring relative setting values representing relative values of photographing setting values, corresponding to one of the at least one photographing recipe selected in the step of selecting according to the preference information; and a step of transmitting the relative setting values acquired in the step of acquiring, to a second information processing device that sets a photographing device to perform photographing on a basis of the relative setting values.

\* \* \* \* \*